United States Patent Office 3,115,478
Patented Dec. 24, 1963

3,115,478
POLY-ALPHA-OLEFIN COMPOSITIONS HAVING IMPROVED DYE AFFINITY
Piero Giustiniani, Giulio Natta, and Giorgio Mazzanti, Milan, and Giovanni Crespi, Busto Arsizio, Italy, assignors to Montecatini, Societa Generale per l'Industria Mineraria e Chimica, Milan, Italy, a corporation of Italy
No Drawing. Filed Aug. 1, 1960, Ser. No. 46,391
Claims priority, application Italy Aug. 3, 1959
12 Claims. (Cl. 260—45.5)

The present invention relates to polymeric compositions having an improved affinity for dyes, these compositions containing a polymer of a poly-alpha-olefin and a polymer obtained by polymerization of at least one monomer having polar groups containing at least one nitrogen atom.

It is known that certain linear crystalline hydrocarbons polymers containing isotactic macromolecules and having a melting point between about 150° and 300° C. can be used for the production of textile fibres. For example, polymers of vinyl hydrocarbons such as polypropylene containing isotactic macromolecules, offer considerable advantages in the production of fibres, particularly because of their good mechanical properties and light weight. However, such polymers have not been satisfactory because of their poor affinity for dyes, this poor affinity being due to the particular chemical nature of such polyolefinic hydrocarbons.

Many processes have been proposed in order to improve the affinity of such polyolefinic hydrocarbons for dyes, such as the addition of suitable solid substances, which are soluble in the molten polyolefin, to the polyolefin before spinning. The addition of, e.g., basic substances facilitates dyeing with acid dyes; similarly the addition of acid substances favors dyeing with basic dyes.

However, such processes have not been completely satisfactory, for not all of the added substances remain dissolved in the polyolefin, and when such substances solidify and crystallize, they separate out in an non-uniform manner, thereby reducing the mechanical strength of the filaments. Moreover, substances which are soluble in the molten polyolefin, are often not soluble in the cooled solid polyolefin. This causes formation of a separate phase on mechanically resistant fibre, so that such substances are easily removed during wet washing with surface-active substances or during dry cleaning with organic solvents.

It has also been proposed to increase the affinity of dyes for polyolefin fibres by grafting polymeric chains onto the polyolefin chains, or by subjecting the fibres to a preliminary peroxidation, or by subjecting the fibres to high energy radiation, these latter treatments resulting in the formation of free radicals. When such processes are applied to the polyolefin after it is in filamentary form, the surface properties of the fibres are considerably modified and the dye receptivity is improved. However, when such processes are applied to highly crystalline filaments, any grafting onto the preformed fibres takes place primarily only at the surface. Therefore, subsequent dyeing is limited to the surface portion of the fibre and the dye does not penetrate inside the fibre.

It is therefore an object of this invention to provide a polymeric composition having improved affinity for dyes.

Additional objects will become apparent hereinafter.

Surprisingly, we have found that linear polymers of monomers having polar groups containing at least one nitrogen atom, these polymers having a regular structure, can be dissolved in molten polyolefins, e.g., in polypropylene containing isotactic macromolecules. Thus, polymeric compositions are obtained consisting of (1) a linear poly-alpha-olefin and (2) at least one linear high molecular weight polymer having regular structure, this polymer being soluble in the linear poly-alpha-olefin when the poly-alpha-olefin is in the molten state. This linear polymer having regular structure is obtained by polymerization of a monomer having at least one polar group containing at least one nitrogen atom or by copolymerization of said monomer with another monomer.

The polymeric compositions thus obtained possess a much higher affinity for dyes than do the normal poly-alpha-olefins.

From the aforementioned polymeric compositions one can, by means of spinning, stretching and, when necessary, annealing, obtain filaments containing the two linear polymers as separate phases, both in the oriented state. The filaments thus obtained present, insofar as their absorbing properties are concerned, properties intermediate between those of the two pure polymers.

In the preparation of textile fibres the polymeric compositions preferably contain a linear-alpha-olefin polymer consisting primarily of isotactic macromolecules, and a polymer having such regularity of steric structure as to be crystallizable.

More particularly, the first component may consist of isotactic polymers or of polymers prevailingly consisting of isoltactic macromolecules, these polymers preferably being obtained from the monomers propylene, styrene, or 4-methyl pentene-1.

The second component may consist of polymers having the isotactic structure of monomers of the vinyl-pyridine type, such as 2-vinyl pyridine, 4-vinyl pyridine, 5-ethyl-2-vinyl pyridine and higher alkenyl pyridines, such as allyl- or butenyl pyridine.

Further the second component may be copolymers obtained from (a) the above cited vinyl pyridine monomers and (b) monomers of a different kind (such as styrene, acrylonitrile, acrylates and the like).

It is preferable that said copolymers be crystalline to some extent: Therefore it is preferred that they contain long stretches of monomeric units derived from monomers of the (a) type which impart crystallinity to the macromolecules.

Textile fibres presenting very good mechanical properties have been obtained by using polymeric compositions in which the second component consists of isotactic crystalline polymers having a melting point not very different from that of the first component polyolefin used for preparing the fibres.

Since the solidification of the two polymers takes place at only slightly different temperatures, the orientation by stretching can take place for both types of macromolecules at the same stretching temperature.

The fibers thus obtained, containing both types of macromolecules in the oriented state generally exhibit better mechanical properties than fibers obtained by spinning together a crystalline and an amorphous substance. Nevertheless, the filament remarkably acquires certain of the specific properties of the added macromolecules (i.e. the second component) even if these are present in relatively low amounts. More particularly, fibres thus obtained by co-spinning exhibit dye-absorbing properties of the second polymer component which polymer has been added to improve the dyeability. In general, the second component may consist of any high molecular weight linear polymer with a sterically regular structure, which polymer contains at least one nitrogen atom and is soluble in the molten first component polymer. The second component polymer is preferably present in an amount between 2% and 30%, preferably between 2 and 10% by weight.

Macromolecules of the second component exhibit a stronger hindrance toward crystallization. However, this is not a disadvantage and, in fact, in certain instances is advantageous, for the amorphous polymer portions are more easily dyeable, while a very limited crystallization is sufficient to assure adequate resistance against solvents and detergents.

Extremely desirable results are obtained by co-spinning polypropylene containing isotactic macromolecules with crystalline polymers containing basic groups, such as polyvinylpyridines containing isotactic macromolecules obtained, e.g., with the aid of catalysts consisting of certain compounds of metals belonging to the 1st, 2nd or 3rd group of the periodic table. Examples of such compounds are metal hydrides or metal compounds containing metal-to-nitrogen bonds. For instance, the poly-2-vinylpyridine used in certain of the examples hereinafter has a melting point of between 150 and 210° C. depending on the degree of regularity of its macromolecules, i.e., a melting point sufficiently near that of polypropylene consisting essentially of isotactic macromolecules. From the mixture of the two molten polymers filaments are obtained by spinning and subsequent stretching. These filaments exhibit very good mechanical characteristics and a very good affinity for acid dyes. Due to the high molecular weight of poly-2-vinylpyridine, the final melting point of the polypropylene crystals forming the fibre remains practically unaltered. As a matter of fact, examination under a polarizing microscope of mixtures consisting of 75–90% polypropylene (melting point 170° C.) and 10–25% polyvinylpyridine (melting point 195–205° C.) indicates that most of the spherulites (probably those consisting of polypropylene) disappear at about 170° C. Thus, mixing the polypropylene with the polyvinylpyridine does not result in a decrease in the melting point of polypropylene. This is in contrast to the decrease in polypropylene melting point which does occur when polypropylene is mixed with an amorphous substance and, more particularly, with a low-molecular weight substance. The high melting point of polyvinylpyridine and its high molecular weight appear to be the reason that the melting point of polypropylene in the mixture remains practically unaltered.

In general, relatively small amounts of polyvinylpyridine e.g. from 2% to 30%, preferably from 2 to 10% by weight, in the mixture are sufficient to produce fibres having good dye-receptivity.

Similar results are obtained using poly-4-vinyl-pyridine as the second component. As compared to poly-2-vinylpyridine, poly-4-vinylpyridine possesses a slightly higher softening point. The mechanical properties of the fibres obtained from mixtures of poly-2- or poly-4-vinylpyridine and polypropylene depend mainly on the characteristics (molecular weight and crystallinity) of the particular polypropylene used, i.e., the presence of the vinyl pyridine polymer has little or no substantial effect on such properties. For example, when the spinning composition consists solely of polypropylene containing about 95% isotactic macromolecules not extractable with boiling n-heptane and having an intrinsic viscosity of between 1 and 1.5, fibres are obtained having a tenacity of about 5 g./den. and an elongation at brake of 20 to 25%. However, when a mixture of the above polypropylene with 10% poly-2-vinylpyridine is spun and stretched to form fibres in the same manner as done on the above polypropylene alone, the resulting fibres exhibit virtually the same tenacity and elongation at break as did the polypropylene fibres.

Another important characteristic of our fibres, either before or even after dyeing, is their high resistance to solvents and to the action of detergents containing surface-active agents. This behavior is virtually the same as that exhibited by a fibre consisting solely of polypropylene. Thus, fibres obtained according to our invention are strikingly differentiated from those fibres heretofore obtained by adding amorphous polymers to polypropylene, e.g., such amorphous polymers as amorphous poly-vinylpyridine obtained by use of conventional non-stereospecific polymerization processes.

While the fibres obtained from mixtures polypropylene containing isotactic macromolecules and amorphous polyvinylpyridine (obtained as before mentioned), assume upon melt spinning a nondesirable yellowish-brown coloration, those obtained from the mixtures containing polypropylene containing isotactic macromolecules and, according to the present invention, crystallizable polyvinyl pyridines, do not change color during melt spinning.

Not even high temperature treatments (about 125° C. in air for 30 minutes) alter the excellent properties of the fibre.

A further advantage resides in the resistance of our fibres to ironing. This resistance is equivalent to that of fibres consisting solely of polyethylene. This is in distinct contrast to the lower resistance generally obtained when fusible low molecular weight organic amorphous substances are added to polypropylene during spinning. In this latter instance, a decrease in the melting point of the fibre occurs, resulting in lower resistance to deformation at temperatures higher than 100° C. and in considerable impairment of the dimensional stability of the fibre, even at the temperature of boiling water.

Dyeing of fibres containing polyvinylpyridine is preferably carried out with the use of acid dyes.

The addition of substances exerting a swelling action on the polyvinylpyridine is often convenient. A preliminary treatment of the stretched fibre with an aqueous solution of an epoxy compound (such as ethylene glycol diglycidyl ether) seems to be particularly useful for improving the resistance of the dyed fibre to solvents and to the action of detergence containing surface-active agents.

The following examples will further illustrate our invention. All parts are by weight unless otherwise indicated.

Example 1

95 parts by weight polypropylene obtained as described in the Italian Patent No. 537,425 having an intrinsic viscosity of 1.1 in tetrahydronaphthalene at 135° C. and a content of 93% of isotactic macromolecules (not extractable with boiling n-heptane) are imitately mixed with 5 parts by weight of poly-2-vinylpyridine (obtained as described in the U.S. patent application Serial No. 38,580, filed June 24, 1960) having isotactic structure, insoluble in boiling acetone, crystalline by X-ray examination, and having an intrinsic viscosity (determined in dimethylformamide at 30° C.) of 0.4. This mixture is extruded through a spineret provided with 4 holes, each having a diameter of 0.8 mm., under a pressure of 10–15 kg./cm.$^2$ at a temperature of 220° C., thereby obtaining fibres having a good regularity of count, with a rather good spinning rate. The stretching of these fibres was carried out continuously at 130° C. in air, with a stretching ratio of 1:7, to obtain fibres having mechanical characteristics similar to those of fibres made solely of polypropylene and obtained under the same conditions. Good fibres are also obtained, using the same procedure, from mixtures of polypropylene and poly-2-vinylpyridine in weight ratios of 90:10 and 85:15.

The properties of the fibre obtained from the mixture containing 10% poly-2-vinylpyridine, after stretching, is as follows:

Count _____ den./filament __ 5
Tenacity _____ g./den. __ 4.8
Elongation at break _____ percent __ 24

Example 2

90 parts by weight polypropylene (obtained as described in Italian Patent 537,425) having an intrinsic viscosity of 1.4 in tetrahydronaphthalene at 135° C. are intimately mixed with 10 parts poly-4-vinylpyridine (obtained as described in U.S. patent application Serial No. 38,580) having isotactic structure. This mixture is extruded through a monofilament spinneret under a pressure of 5–10 kg./cm.² at a temperature of 240° C., thereby obtaining a filament having a count of 100 denier. This fibre is stretched at 135° C. with a stretching ratio of 1:7.9, obtaining a filament exhibiting the following characteristics:

| | | |
|---|---|---|
| Count | den | 16.4 |
| Tenacity | g./den | 4.98 |
| Elongation at break | percent | 22 |

*Example 3*

A yarn skein obtained by the procedure of Example 1 from a mixture containing 10% by weight of poly-2-vinylpyridine is kept in an aqueous dye solution, having the following compositions:

Dye: ACNA Novamina Red 2G (C. I. 14690), concentration 1g./1 acetic acid (concentration of acetic acid=30 g./liter); surface active agent: Lissapol NX, nonylphenol-ethylene oxide condensate[(R—C$_6$H$_4$O)$_n$—H, where $n$ is a positive integer and R is an alkyl] concentration of about 0.1 g./liter.

The bath is kept at 90–100° C. and the dyeing is continued for about one hour. After this treatment the skein was repeatedly washed with water and soap. A yarn is obtained that is intensely and homogeneously colored with a brilliant red color. A sample of this dyed fibre is treated with trichloroethylene at 70° C. for 30 minutes. After this treatment no difference in the color shade of the fibre is observed.

*Example 4*

Operating as described in Example 3, but substituting ACNA dye solid Novamina yellow C2G (C. I. Acid yellow 61), a fibre is obtained which is intensely dyed in a gold yellow color.

Using ACNA dye solid Novamina Blue CB (C. I. Acid Blue 82), a fibre with a dark blue color is obtained.

The colors of all the aforementioned fibres are stable after repeated washing with water and soap, and are not removed from the fibres by rubbing.

*Example 5*

Yarns obtained by the procedure described in Example 2 and containing 10% vinylpyridine are subjected to dyeing under the following conditions:

Dye 5% by weight of the fibre;
Bath ratio: 1 g. fibre per 50 g. dyeing bath;
Acetic acid concentration of the bath: 5% by weight;
Dye concentration in the bath: 1 g./liter.

By employing ACNA dye Novamina Red B (C. I. Acid Red 62) and Alizarina Blue BV (C. I. 63010) and after dyeing 90 minutes at 90–100° C., fibres are obtained that are intensely dyed a violet red and blue color. If a much lower acetic acid concentration is present in the dyeing bath, the fibre is less intensely colored.

*Example 6*

Yarns obtained by the procedure described in Example 1 and containing 15% poly-2-vinylpyridine are dyed under conditions similar to those described in Example 3, using ACNA dye solid milling red (C. I. Acid Red 99). A fibre with an intense red color is thus obtained.

*Example 7*

A spinning mix is prepared from (1) 900 g. poly-2-vinylpyridine (obtained by polymerization of 2-vinylpyridine with the aid of a catalysts consisting of $$Mg[N(C_2H_5)_2]Br$$

and (2) 9.1 kg. polypropylene having an intrinsic viscosity of 1.37, determined in dimethylformamide at 30° C., an ash content of 0.024%, and a residue after heptane extraction of 96.3%. This mix is granulated at 200–210° C. and the granulated product is spun under the following conditions:

| | |
|---|---|
| Spinneret type | 60/0.8 x 16 mm. |
| Screw temperature | 230° C. |
| Head temperature | 220° C. |
| Spinneret temperature | 220° C. |
| Maximum pressure | 50 kg./cm.². |
| Winding speed | 250 m./minute. |

The yarns obtained are stretched under steam, with a stretching ratio of 1:15 and are then crimped and cut. The staple is immersed in a boiling 10% aqueous ethylene glycol diglycidyl ether solution for 10 minutes and is dried. On the thus epoxidized staple shades of a very good intensity and a good fastness are obtained with the dyes listed in Examples 3–6.

*Example 8*

A yarn prepared according to the preceding example is wetted with a 10% aqueous ethylene diglycidyl ether solution as the yarn leaves the spinneret. The yarn is then stretched in the presence of steam at 130° C. with a stretching ratio of 1:5 and is crimped and cut. Shades having good intensity and fastness are obtained on the staple with the dyes mentioned in the preceding example.

Variations can, of course, be made without departing from the spirit of our invention.

Having thus described our invention, what we desire to secure and claim by Letters Patent is:

1. A composition comprising (1) a linear, crystalline polymer containing isotactic macromolecules selected from the group consisting of polypropylene, polystyrene and poly-4-methyl-pentene-1; and (2) a polymeric vinyl pyridine containing isotactic macromolecules.
2. The composition of claim 1, wherein the linear, crystalline polymer containing isotactic macromolecules is polypropylene consisting essentially of isotactic macromolecules.
3. The polymeric composition of claim 1, wherein the linear, crystalline polymer containing isotactic macromolecules is poly-4-methyl-pentene-1 consisting essentially of isotactic macromolecules.
4. The polymeric composition of claim 1, wherein the linear, crystalline polymer containing isotactic macromolecules is polystyrene consisting essentially of isotactic macromolecules.
5. The polymeric composition of claim 1, wherein the polymeric vinylpyridine is poly-2-vinyl pyridine.
6. The polymeric composition of claim 1, wherein the polymeric vinyl pyridine is poly-4-vinyl pyridine.
7. The polymeric composition of claim 1, wherein the polymeric vinyl pyridine is poly-5-ethyl-2-vinyl pyridine.
8. The polymeric composition of claim 1, wherein the polymeric vinyl pyridine is a vinyl pyridine-styrene copolymer.
9. The polymeric composition of claim 1, wherein the polymeric vinyl pyridine is a vinyl pyridine-acrylonitrile copolymer.
10. The polymeric composition of claim 1, wherein the polymeric vinyl pyridine is present in an amount from 2% to 30% by weight.
11. The composition of claim 1, wherein the polymeric vinyl pyridine possesses a melting point which is near the melting point of the linear crystalline polymer containing isotactic macromolecules.
12. The polymeric composition of claim 1 in the form of a textile fiber possessing dye-affinity.

No references cited.

UNITED STATES PATENT OFFICE
CERTIFICATE OF CORRECTION

Patent No. 3,115,478 December 24, 1963

Piero Giustiniani et al.

It is hereby certified that error appears in the above numbered patent requiring correction and that the said Letters Patent should read as corrected below.

Column 1, line 45, after "on" insert -- the --; column 3, line 62, for "brake" read -- break --; column 4, line 45, for "imitately" read -- intimately --; line 52, for "spineret" read -- spinneret --.

Signed and sealed this 2nd day of June 1964.

(SEAL)
Attest:

ERNEST W. SWIDER
Attesting Officer

EDWARD J. BRENNER
Commissioner of Patents